(No Model.)
H. W. CHURCH.
DRYING APRON AND DRUM CYLINDER FOR SAME.
No. 551,460.  Patented Dec. 17, 1895.
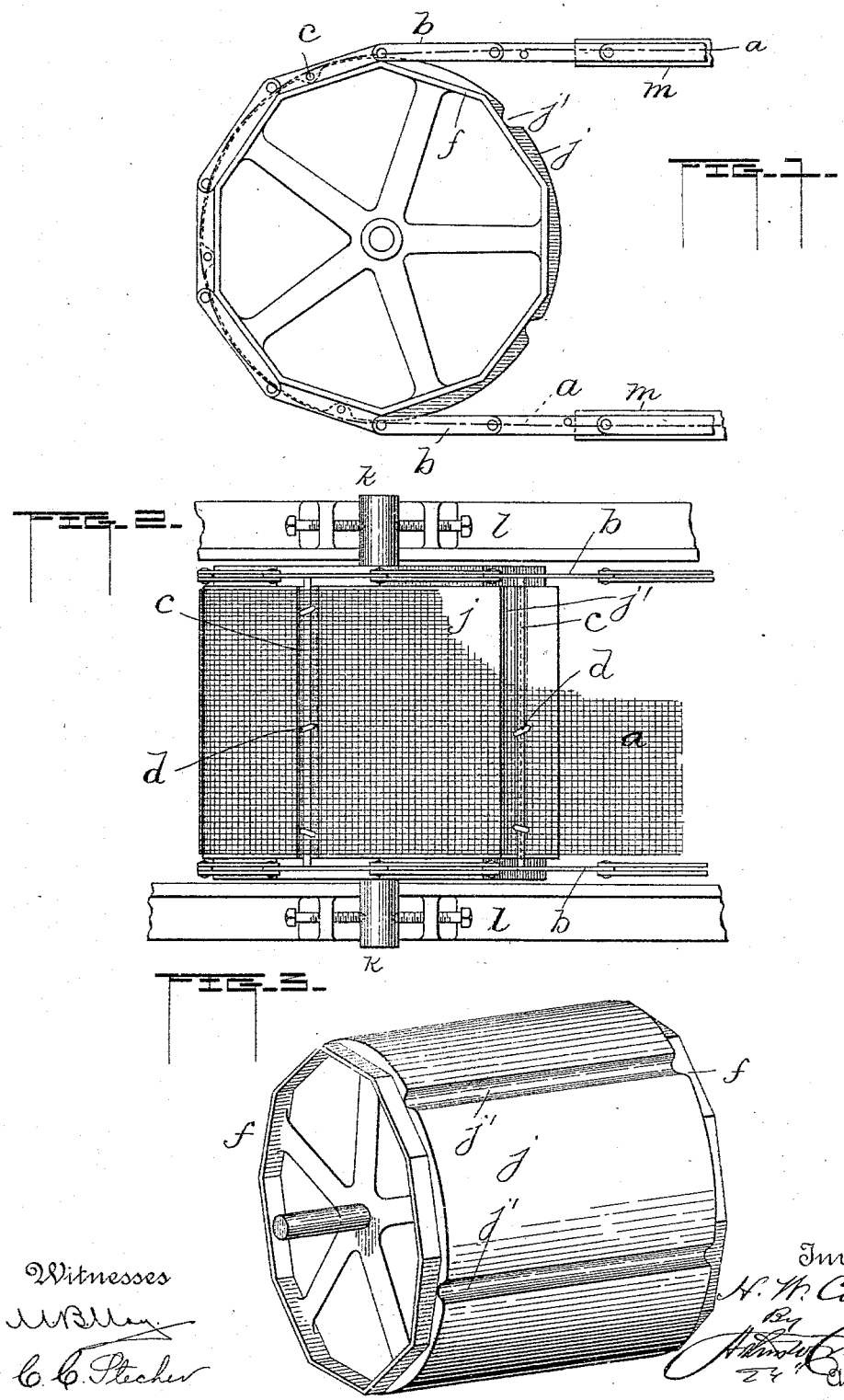

UNITED STATES PATENT OFFICE.

HENRY W. CHURCH, OF LOWELL, MASSACHUSETTS, ASSIGNOR TO THE KITSON MACHINE COMPANY, OF SAME PLACE.

DRYING-APRON AND DRUM-CYLINDER FOR SAME.

SPECIFICATION forming part of Letters Patent No. 551,460, dated December 17, 1895.

Application filed June 14, 1894. Serial No. 514,536. (No model.)

*To all whom it may concern:*

Be it known that I, HENRY W. CHURCH, of Lowell, in the county of Middlesex and State of Massachusetts, have invented certain new and useful Improvements in Drying-Aprons and Drum-Cylinders for Same, of which the following is a specification.

This invention has relation to drying-aprons, and the means for traversing and supporting the same in drying-machines generally, and particularly in machines for drying wool and other textile substances.

Among the difficulties met with in the operation of drying-aprons, which are usually composed of cloth and of great length, has been the fact that they were liable, when they were pulled upon to be drawn along in the machine and around the drums, to become distorted and drawn askew; and, again, it was quite impossible to keep the apron straight and prevent it from what operatives term "wee-wawing." Moreover, when means were provided for relieving the apron of strain and keeping it true or straight difficulties were met with in carrying such means with the apron around the rotating drum. By the present improvements these difficulties and objections are overcome, the said improvements consisting of a drying-apron connected to cross-rods which extend across it and which have their ends secured to the long links of parallel chains located at the outer edges of the apron, in combination with a drum having polygonal heads to engage and drive said chains and a cylindrical body to support and guide said apron, and also having longitudinal grooves to receive the cross-rods when the apron is passing around it.

Reference is to be had to the annexed drawings, and to the letters marked thereon, forming a part of this specification, the same letters designating the same parts or features, as the case may be, wherever they occur.

Of the drawings, Figure 1 is a side elevation of my invention. Fig. 2 is a plan view of what is shown in Fig. 1, with the addition of a supporting-frame. Fig. 3 is a perspective view of the drum.

In the drawings, $a$ designates the apron proper which is composed by preference, though not necessarily, of woven-wire cloth.

$b\ b$ are long-link chains which extend along the sides of the apron, and are connected with the same through the medium of rods or pipes $c$, to which the apron is connected at intervals by any suitable fastenings $d$. The rods $c$ extend across the apron and their ends project beyond the edges of the same and are connected with the chains in such manner as to leave a slight space at each side between the edge of the apron and the chain. Preferably the rods are secured to the alternate links, and the apron is secured to them somewhat loosely, in order that it can be properly supported by the drum, as will be hereinafter described.

$f\ f$ designate the drum-heads, the peripheries of which are of polygonal form, each side of the polygon being of a length corresponding exactly to the length of the links of the chains $b$, so that as the latter pass around the drum-head the links will lie flat on the sides or surfaces of the drum and the joints or pivots will fall at the corners of the polygon, as is clearly shown in Fig. 1.

The body $j$ of the drum is cylindrical in form and is greater in diameter than the heads $f\ f$ with which it is integral. It is provided with longitudinal grooves $j'\ j'$, adapted to receive the cross-rods $c$ when the apron passes around it. In this way the wire apron is properly supported and kept taut, it being so connected to the chain at long intervals that it has more or less freedom in its movements relatively thereto. The journals of the cylinder may be supported in adjustable bearings $k$ on the frame $l$, as shown in Fig. 2.

It will be understood that the apron and carrying-chains are endless, and are stretched between and run over or about two drums. Between the drums the chains run or are supported upon suitable tracks $m$, herein shown as consisting of angle-irons secured to the frame so that one flange will project laterally therefrom.

With this construction and arrangement of parts, the apron will, when in operation, be carried along in straight position, and all liability of wee-wawing avoided; and, furthermore, by providing carrying-chains at the sides or edges of the apron and mediately connecting them with the latter the apron can be carried smoothly around the cylindrical body of the drum, unaffected by the angular or irregular course of the chain about the drum-heads, and substantially all longitudinal strain is taken off the apron proper and is sustained by the chains.

Having thus explained the nature of the invention and described a way of constructing and using the same, though without attempting to set forth all of the forms in which it may be made or all of the modes of its use, it is declared that what is claimed is—

The combination with a drum having heads of a polygonal form and also having a substantially cylindrical body with longitudinal grooves, of a drying apron, chains at the edges of said apron and having long links adapted to engage said polygonal heads and rods connecting the chains and supporting the apron, said rods lying in said grooves, when the apron passes around the drum, substantially as set forth.

In testimony whereof I have signed my name to this specification, in the presence of two subscribing witnesses, this 9th day of June, A. D. 1894.

HENRY W. CHURCH.

Witnesses:
H. C. PERHAM,
J. W. ANDERSON.